United States Patent [19]
Becker et al.

[11] Patent Number: 5,426,750
[45] Date of Patent: Jun. 20, 1995

[54] TRANSLATION LOOKASIDE BUFFER APPARATUS AND METHOD WITH INPUT/OUTPUT ENTRIES, PAGE TABLE ENTRIES AND PAGE TABLE POINTERS

[75] Inventors: Robert Becker, Shirley; Peter Mehring, Wilmington, both of Mass.

[73] Assignee: Sun Microsystems, Inc., Mountain View, Calif.

[21] Appl. No.: 107,220

[22] Filed: Aug. 16, 1993

Related U.S. Application Data

[63] Continuation of Ser. No. 631,966, Dec. 21, 1990, abandoned.

[51] Int. Cl.[6] ............................................. G06F 17/10
[52] U.S. Cl. ................................................. 395/400
[58] Field of Search ...................... 395/400, 425; 364/DIG. 1, DIG. 2, 200 MS File, 900 MS File

[56] References Cited

U.S. PATENT DOCUMENTS

| | | | |
|---|---|---|---|
| 3,576,543 | 4/1971 | Melliar-Smith | 395/400 |
| 3,938,100 | 2/1976 | Steiner | 395/400 |
| 4,615,006 | 9/1986 | Hirano | 395/400 |
| 4,654,791 | 3/1987 | Ushiro | 395/275 |
| 4,669,043 | 5/1987 | Kaplinsky | 395/400 |
| 4,695,950 | 9/1987 | Brandt et al. | 395/400 |
| 4,763,250 | 8/1988 | Keshlear et al. | 395/400 |
| 4,792,897 | 12/1988 | Gotou et al. | 395/400 |
| 4,876,646 | 10/1989 | Gotou et al. | 395/400 |
| 4,890,223 | 12/1989 | Cruess et al. | 395/400 |

FOREIGN PATENT DOCUMENTS

| | | |
|---|---|---|
| 0175091 | 7/1985 | European Pat. Off. . |
| 0229253 | 11/1986 | European Pat. Off. . |
| 1438039 | 7/1973 | United Kingdom . |
| WO87/04544 | 7/1987 | WIPO . |

*Primary Examiner*—Jack B. Harvey
*Assistant Examiner*—Jack A. Lane
*Attorney, Agent, or Firm*—Blakely Sokoloff Taylor & Zafman

[57] ABSTRACT

A translation lookaside buffer for use with a virtual memory system including apparatus for storing virtual addresses, apparatus for storing a physical address associated with each of the virtual addresses, some of the physical addresses corresponding to pages in which the information sought by the virtual address resides, and others of the physical addresses corresponding to pages in which the physical address of information sought by the virtual address resides.

9 Claims, 3 Drawing Sheets

TRANSLATION LOOKASIDE BUFFER APPARATUS AND METHOD WITH INPUT/OUTPUT ENTRIES, PAGE TABLE ENTRIES AND PAGE TABLE POINTERS

This is a continuation/divisional of application Ser. No. 07/631,966 filed Dec. 21, 1990, now abandoned.

BACKGROUND OF THE INVENTION

1. Field of the Invention

This invention relates to computer memory management systems and, more particularly, to method and apparatus for translating virtual addresses to physical addresses in computer memory systems which utilize virtual memory addressing.

2. History of the Prior Art

A virtual memory system is one which allows addressing of very large amounts of memory as though all of that memory were the main memory of the computer system. Such a system allows this even though actual main memory may consist of some substantially lesser amount of storage space than the addressable memory. For example, main memory may consist of one megabyte of random access memory while sixty-four megabytes of memory are addressable using the virtual memory addressing system.

Virtual memory systems accomplish this feat by providing memory management units which translate virtual memory addresses into physical memory addresses. A particular physical address may be in main memory or in long term storage. If the physical address of information sought is in main memory, the information is accessed and utilized by the computer. If the physical address is in long term storage, the information is transferred (usually in a block referred to as a page) to main memory where it may be used. This transfer may necessitate that other information be swapped out of main memory to long term memory to make room for the new information. If so, this is accomplished under control of the memory management unit.

Although a computer may have a very large addressable space because of its virtual memory system, this does not guarantee that the computer will operate rapidly. Rapid operation is determined by how rapidly the components operate and how fast memory may be accessed. The latter depends upon the speed of the components, but to a greater extent upon the process required to translate addresses from virtual to physical and then retrieve the information from memory. A basic virtual memory arrangement creates lookup tables which are stored in main memory. Any virtual address presented to the memory management unit is compared to the values stored in these tables to determine the physical address to access. There are often several levels of tables, and the comparison takes a great deal of system clock time.

To overcome this delay, virtual memory systems often include cache memories which use very fast components to store recently used data and instructions. These cache memories are usually connected so that they are rapidly accessible to the processors. These caches are first looked to by a processor before going to main memory for any information. The theory of these caches is that information most recently used is more likely to be needed again before other information is needed. This theory is valid, and many systems using cache memories have hit rates of over ninety percent.

However, even these cache memories must be addressed in some manner, either directly using the virtual addresses or through translated physical addresses. Addressing by virtual addresses raises a substantial problem involving multiple copies of information, some of which may be stale and unusable; this problem is expensive to overcome. Consequently, cache addressing by physical addresses is preferred for its economy. Since this form of addressing requires that the virtual address be translated to a physical address before the cache memory can be accessed, systems using these cache memories have developed arrangements for quickly providing the physical addresses without having to go through all of the steps of the page table lookup process.

A typical arrangement of this type is called a translation lookaside buffer (TLB). A translation lookaside buffer is essentially a buffer for caching virtual addresses which have been recently used along with their related physical addresses. Such an address cache works on the same principle as do caches holding data and instructions, the most recently used addresses are more likely to be used than are other addresses. When provided a virtual address which is held in the translation lookaside buffer, the translation lookaside buffer furnishes a physical address for the information. If that physical address is in the related cache, then the information is immediately available to the processor without the necessity of going through the time consuming process of referring to the page lookup tables in main memory.

If when the processor sends a virtual address to the translation lookaside buffer, the address is not included in the translation lookaside buffer, then the memory management unit must retrieve the address using the lookup tables in main memory. To accomplish this, the typical memory management unit looks to a register for the address of a base table which usually stores addresses pointing to other levels of tables. At the base table the memory management unit retrieves this pointer and places it in another register. The memory management unit uses this pointer to go to the next level of table. This process continues until the physical address of the information sought is recovered. When the physical address is recovered, it is stored along with the virtual address in the translation lookaside buffer so that the next time it is needed it is immediately available. When the information is recovered, it is stored in the cache under the physical address. This saves a great deal of time on the next use of the information because a typical lookup in the page tables may take from ten to fifteen clock cycles at each level of the search, while accessing the information using the translation lookaside buffer and the caches may require only one or two clock cycles.

One of the difficulties with such a system is that the page table lookup process is required whenever a physical address is not in the translation lookaside buffer. This is true even though most of the steps of that lookup (the deriving of pointers) have occurred over and over prior to the particular lookup operation. This occurs because the registers used to store pointers to the different levels of page tables are in a resource apart from the translation lookaside buffer and are typically capable of storing only one address pointer at a time. Consequently, once a lookup process begins, it is necessary to step through the entire process for each level of the table which must be traversed; that is, the machine must find a first pointer and store it, use that pointer to find the next pointer and store it, and then use that pointer (hopefully) to find the address. With the next lookup process, all of these pointers are written over. In economical prior art arrangements without a separate cache for storing address pointers, there is no way to short circuit this time consuming process.

Not only is the constant referral from the translation lookaside buffer to page tables a problem, many addresses which must be translated are simply not stored in the translation lookaside buffer at all. For example, in addition to data and instructions, a processor often deals with input/output information. Although this information may be used by the processor, it is usually handled by separate addressing means such as an input/output processor or a direct memory access unit.

Thus, very fast prior art computer systems using separate caches for data and for instructions and having a direct memory access facility, typically require individual memory management resources for accomplishing the functions of a translation lookaside buffer to provide addressing within the caches, for doing the lookups in the page tables of main memory, and for managing the addressing of input/output information. In prior art systems a very large amount of silicon was required for these different individual arrangements for rapidly addressing data, instructions, and input/output functions. Moreover, prior art systems are incapable of providing the speed of address translation desired in a substantial number of situations.

SUMMARY OF THE INVENTION

It is, therefore, an object of the present invention to increase the speed of operation of the memory management apparatus of a computer system using virtual memory addressing through the use of an expanded caching arrangement without the increase in cost normally associated with the increase in data being cached.

It is another more specific object of the present invention to provide a translation lookaside buffer capable of handling the translation of addresses for data, instructions, and input/output in a system having both data and instruction caches.

These and other objects of the present invention are realized in a translation lookaside buffer designed to store page table entries and page table pointers for translating data, instructions, and input/output addresses. By storing both page table entries and page table pointers, the translation lookaside buffer is able to translate a very large percent of all virtual addresses without a complete lookup in the page tables even though the particular virtual address is not in the translation lookaside buffer.

These and other objects and features of the invention will be better understood by reference to the detailed description which follows taken together with the drawings in which like elements are referred to by like designations throughout the several views.

DETAILED DESCRIPTION OF THE INVENTION

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are ones requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

Figure 1:
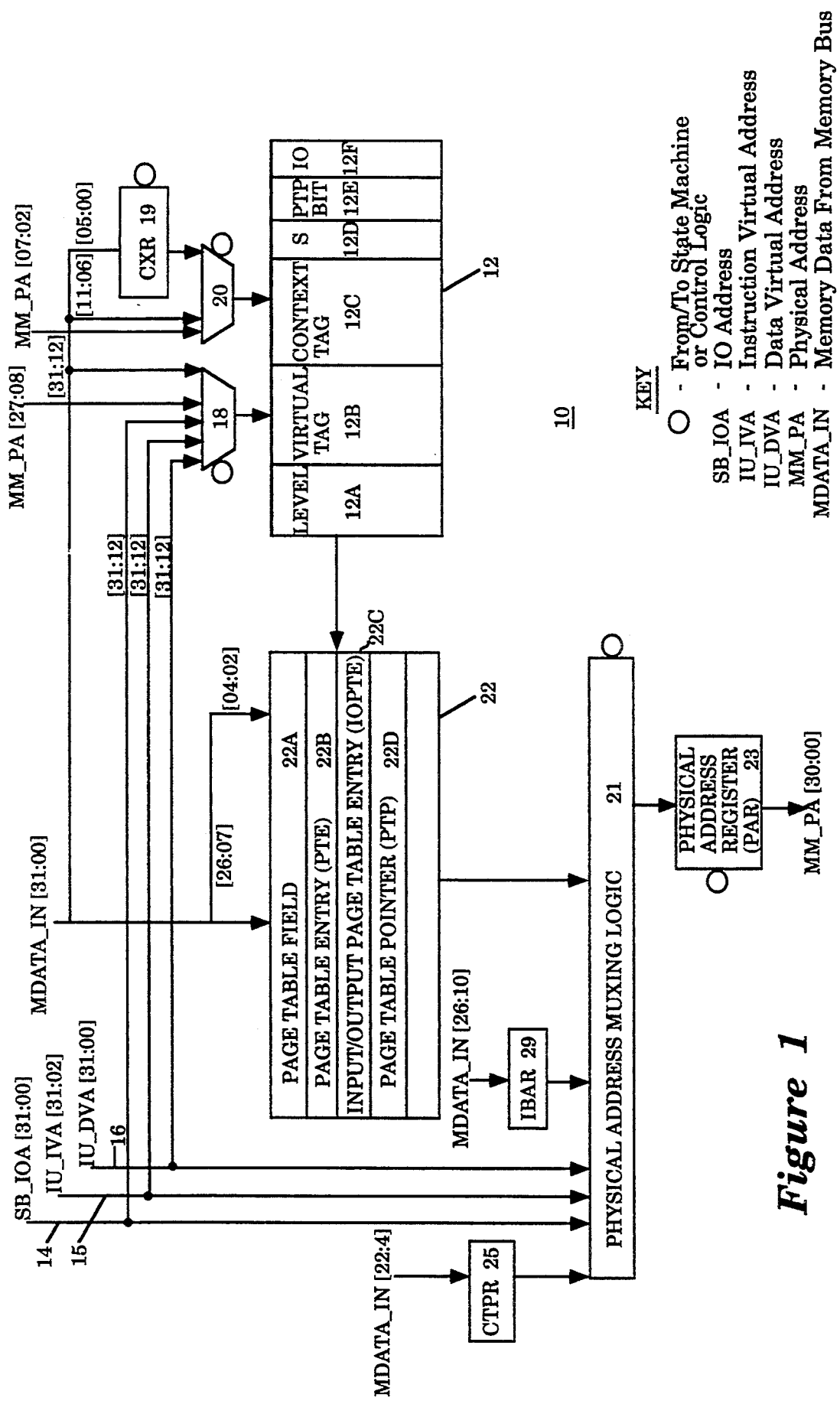
FIG. 1 is a block diagram illustrating a translation lookaside buffer constructed in accordance with the present invention.

Referring now to FIG. 1 there is illustrated a block diagram of a translation lookaside buffer 10 constructed in accordance with the invention. The translation lookaside buffer 10 includes a first portion 12 which stores among other things a plurality of virtual memory addresses with which an incoming virtual address is to be compared. In a preferred embodiment of the invention, the portion 12 is designed to store thirty-two distinct virtual address tags 12B in a fully associative cache. The portion 12 also includes storage in addition to the locations storing the virtual addresses. In the preferred embodiment of this invention, the additional storage locations include three bits which indicate a level at which a page table search is to be conducted (level 12A), six bits which indicate context (context tag 12C), a bit which indicates supervisor control (S12D), a bit which indicates that a page table pointer is stored in the translation lookaside buffer 10 (PTP bit 12B), and an input/output bit (IO 12F).

Although not required by the invention, the preferred embodiment of the invention utilizes content addressable memory for the virtual address tag bits 12B and the context tag bits 12C so that a comparison with the values stored in each may be made by the simple presentation of an address to the portion 12. Alternatively, an external comparator might be associated with the portion 12 to provide a comparison of the virtual address sought and the bits stored in the portion 12.

In any case, the virtual address sought is presented on one of three sets of input lines 14, SB_IOA[31:00], 15, or 16. The address presented on the lines 14 is furnished by the input/output circuitry of the computer system. The address presented on the lines 15, IU_IVA[31:02], is an instruction address furnished by the integer processor of the computer system. The address presented on the lines 16, IU_DVA[31:00], is a data address furnished by the integer processor of the computer system. In each case, the highest twenty bits of the virtual address sought are furnished to the portion 12 for comparison with the addresses stored therein. The particular virtual address is furnished to the virtual tag section by a multiplexor 18 in response to a control signal designating the particular type of information sought. For example, an instruction in the integer processor designates the information sought as data or an instruction while the input/output circuitry indicates that the information sought is for input/output purposes.

At the same time as the high order bits of the virtual address are presented to the multiplexor 18, a multiplexor 20 furnishes a context tag which is compared with the values in the context tag bit positions 12C. The context tag is furnished from a context register (CXR) 19 and is a value written by the memory management software. For both a data address and an instruction address (when not in supervisor mode), both the virtual address tag 12B and the context tag 12C must match the bits sought for there to be a hit in the translation lookaside buffer 10. The context tag is a group of bits which allows the system to select among a plurality of different groups of page tables which are used with different software programs. For any particular user program being run on a system, the context tag 12C remains the same throughout the program. For the purposes of this invention, the context tag may be considered to be additional address bits.

In general, when the virtual address bits and the context bits match (and presuming in the preferred embodiment that certain other bits match), the high order bits of a physical address are provided as output. These high order bits of each physical address are stored in a portion 22 of the translation lookaside buffer 10 in the same row (such as page table field 22A) as the virtual address from which they are to be translated. These high order bits provide a physical page number from which a physical address may be obtained. The low order bits of the virtual address and the physical address are the same and indicate the byte address within any particular page. Thus, the low order bits of the virtual address are combined with the physical page number provided by the translation lookaside buffer 10 to provide a complete physical address.

All of the foregoing seems very straightforward. However, in order to produce an economical system, the physical addresses stored in the translation lookaside buffer 10 of the present invention are of three distinct types. The values stored may be page table entries 22B, input/output page table entries 22C, and page table pointers 22D. A normal page table entry 22B provides the physical address of an entry and its permissions (what is required to access the entry). A page table entry is the normal physical page address information provided by prior art translation lookaside buffers. This page address may be used to access a memory address to derive information. This address is combined with the low order virtual address bits by a multiplexor 21 and placed in a physical address register (PAR) 23 to derive the information from either of the two physically addressed caches (or from memory when a cache miss occurs) when a hit occurs in the translation lookaside buffer 10.

A page table pointer 12D, on the other hand, is the base physical address of another page table. Thus, the page table pointer 12D designated when combined with an index of the virtual address will point to an address in another page table at which a lookup may be made. Since a page table pointer 12D points to an address in main memory, it (like a page table entry 12B) is a physical address. However, it is not used to derive immediately the information sought, but to derive another physical address of another level of page translation. This other address may be another page table pointer or it may be the page table entry (the physical page address). If it is a page table entry, then the physical address is stored in the translation lookaside buffer along with the virtual address originally sought and is immediately used to derive the information sought. If the address is a page table pointer 12D, on the other hand, then the physical address is stored in the translation lookaside buffer along with the physical base address of the next page table; and the value is used to access the translation lookaside buffer 10 to determine if that physical address resides in the portion 12 of the translation lookaside buffer 10.

Thus, as may be seen, these two distinct types of physical address information must be handled differently once derived; consequently, they must be clearly distinguished in the translation lookaside buffer 10. In order to accomplish this, the virtual addresses pointing to these two different physical values in the portion 12 of the translation lookaside buffer 10 must be appropriately designated and used by the computer system in a manner which will be discussed below. For example, the number of bits actually used to match the virtual address will vary depending on the level 12A of the page table to which a page table pointer 22D points.

In a similar manner, the virtual addresses 14 provided by the input/output circuitry furnish information which (once derived) must be handled differently than the other two forms of physical addresses. In the same manner as with the other virtual addresses, those used for input/output purposes must be appropriately designated and selected when used by the computer system.

In order to match different portions of the virtual address bits offered, the three bit level 12A field is used. Level 12A designates the size of a page in the particular virtual memory system. As those skilled in the art will understand, the size of a page of memory determines how many bits of address are necessary to designate that page and how many bits are necessary to designate a byte within a page. If there is only one very large page, then all of the bits are used to designate the address within the page and, in effect, the virtual address is the physical address. If the pages are small, on the other hand, then fewer bits are necessary to designate a byte within a page but more bits are necessary to address a page from the larger number of pages available. Thus, the level 12A field bits are used to indicate that a comparison must include a particular number of high order bits of the virtual address.

In the preferred embodiment of the invention, these three level 12A field bits are coded as either 100, 110, or 111 to indicate three possible levels of a page table entry. These bits are set to the appropriate level whenever page table entry 22B values are stored in the translation lookaside buffer 10. In a preferred embodiment of the invention, virtual address bits 31:24 are used to address the largest page at level 100, virtual address bits 31:18 are used to address the next largest page at level 110, and virtual address bits 31:12 are used to address the smallest page at level 111.

Since the highest order bit of level 12A is set to one for each of these level values only when an entry is made to the translation lookaside buffer 10, this bit may also be considered to indicate the validity of the entry. This eliminates the need for an additional bit in each row of the translation lookaside buffer 12. Since the memory used in the preferred embodiment is content addressable memory, this is a significant saving.

In addition to the level 12A field bits, a single bit field S12D is utilized to indicate supervisor rather than user control of the system. For the purpose of the present invention, that bit has little to do with operation except that it is forced to a one to indicate that a data or instruction address translation is being accomplished. This allows the use of the context portion as part of the address tag. In the case of input/output addresses stored in the translation lookaside buffer, the bit remains a zero.

In addition to the level 12A and supervisor 12D bits, single field PTP bit 12E is utilized to indicate that a page table pointer (a physical rather than a virtual address) is stored in a particular row of portion 12 of the translation lookaside buffer 10. This bit is set whenever such a pointer is stored and facilitates the use of the invention in a manner to be explained hereinafter. When a page table pointer is held in the translation lookaside buffer as is indicated by the page table pointer (PTP) 12E bit, the level 12A bits are always set to 111 for that entry. This allows the entire address field to be compared to the input for page table pointer look ups. This is required because the translation lookaside buffer tag in the portion 12 is a physical address which uses the entire virtual 12B and context tag 12C address fields. A controlling state machine indicates the current page table level.

When dealing with input/output addresses, a single one level table separate from the other page tables is involved. An input/output base address register (IBAR) 29 contains a base address. An input/output control register contains a range field which indicates how large the input/output page table is and designates how many low order bits of the virtual address are necessary to access an address within the input/output page table. Once the physical address is derived, it is placed back in the translation lookaside buffer 10 with the virtual address generated by the input/output controller so that the address is immediately available when next the particular virtual address is furnished by the input/output controller. The input/output bit 12F is used with such an address to indicate its type.

In order to better understand the invention, the operation of the system in responding to a virtual address is now considered. Presuming that the computer has just been turned on, the general process in so far as this invention is concerned is that the operating system is placed in main memory, and the supervisor portion of the operating system sets up the page tables and then turns over the memory control functions to the memory management unit. At this point, nothing has been placed in the caches or in the translation lookaside buffer 10. When the first virtual address is presented to the translation lookaside buffer 10 for comparison, the appropriate bits of the virtual address are compared to the bits stored in the context tag 12C and virtual tag 12B fields in portion 12. There being no addresses stored therein initially, a cache miss will be signalled.

In the case of a virtual address generated by the input/output memory management unit, a miss causes a base address to be generated using a value stored in an Ibar register 29. The address pointed to is the base address of a single page table which is unique to input/output addressing. An input/output control register of the input/output memory management unit contains a field telling how large the page of the input/output page table is. From this size, the number of low order virtual address bits required to select the entry position is determined. These low order bits and the base address in the register 29 are combined using the multiplexor 21, and a physical address for the input/output virtual address is found in the input/output page table. This value and the virtual address causing its generation are stored in the translation lookaside buffer 10 so that when the virtual address is next indicated, the physical address is immediately available.

If the virtual address which caused the translation lookaside buffer miss is the address of an instruction or data, on the other hand, this causes a base address to be generated by the combination of a base page address stored in a context table pointer register (CTPR) 25 and six lower order bits stored in a context register (CXR) 19. This base address points to a word in the lowest level table of the page tables used for all addressing other than input/output. For instructions and data, this base level table is allowed to hold only page table pointers because the page size available at this level encompasses the entire virtual memory. Were this level to hold a page table entry (i.e., a physical address of the information sought), then the mapping would be direct from physical memory to virtual memory (each physical address would be indicated by only a single unique virtual address); and there would be no reason to have a virtual memory at all. In fact, apart from the present invention, a mode bit is provided by software in a control register which effectively bypasses translation and allows the system to set virtual memory to equal physical memory.

At this point, the virtual address has caused the retrieval of a page table pointer from main memory. This pointer is the address of the next level page table. This page table pointer is stored in the translation lookaside buffer 10 in the physical address field of portion 22. Stored in the same line of the translation lookaside buffer 10 in the portion 12 are the base address (a physical address) generated from the bits in the context table pointer register (CTPR) 25 and the context register (CXR) 19, an indication in the PTP bit 12E that the tag portion of the translation lookaside buffer 12 contains a physical address, and a setting of the level 12A bits to 111 to enable the full comparison of all three fields of address in the portion 12. Moreover, the supervisor bit 12D is set when a page table pointer is stored in portion 12 of the translation lookaside buffer 10 to allow the use of the context portion 12C as part of the physical address tag. In addition, the I/O bit 12F is cleared for this entry to insure that an identical input/output virtual address will not hit when compared to this entry since input/output translation uses a different page table.

The base address, which is still held in the physical address register 23, is then presented again to the translation lookaside buffer 10; and a hit occurs. The hit produces the pointer just stored in the physical address portion field 22. This address is then loaded into the physical address register 23. The contents of the physical address register 23 is then compared to the translation lookaside buffer 12, and a miss occurs. On detecting the miss, main memory is accessed using the contents of physical address register 23 combined with the index field from the original virtual address, as indicated by the controlling state machine. This new address points to a level two page table, which may contain either a page table entry (an actual physical address corresponding to the physical address being translated), or a page table pointer which contains a physical address pointer to the next level page table.

If the entry retrieved was a page table entry, the contents of the address read (a physical address with protection information)is stored in the physical address portion 22 of the translation lookaside buffer 10. Stored in the same line of the translation lookaside buffer 10 in the portion 12 are twenty bits of the original virtual address (bits [26:12]) in virtual tag 12B, the current value of the context register 19 in context tag 12C, the level bits indicating the level at which the the current page table entry was found in level 12A, the supervisor bit 12D which is set according the IU machine state, and the PTP 12E and IO 12F bits (which are cleared). The orginal translation is then retried, producing a hit when compared to the recently updated entry.

If the entry read from main memory is a page table pointer, on the other hand, it is stored in the physical address portion 22 of the translation lookaside buffer 10. Stored in the same line of the translation lookaside buffer 10 in the portion 12 are the physical address of the pointer read from the physical address register 23, an indication in the PTP bit 12E that the tag portion 12 of the translation lookaside buffer 10 contains a physical address, a setting of the level bits 12A to enable the full comparison of all three fields of address in the portion 12, and a setting of the supervisor bit 12D which is identical to the previous loading of the page table pointer.

The contents of the physical address register 23 is then compared to the portion 12 of the translation lookaside buffer 10, and a hit occurs. This hit produces the pointer just stored in the field of the physical address portion 22. At this point, main memory is accessed to read the current page table entry. This entry is treated in a manner similar to the previous page table read except that the level field of a page table entry will reflect the current page table level. In the preferred embodiment of the invention three page table levels are supported. Thus, the third level page tables only contains page table entries. Consequently, a third access of main memory will result in the reading of a page table entry which will be stored in the translation lookaside buffer 10 in the manner previously discussed. Following the storing of a page table entry in the translation lookaside buffer 10, the original virtual address is always retried resulting in a translated address for the cache requesting it.

Once the translated address of the information sought is recovered, that address is used to help determine if the information being sought is resident in the cache which requested the address translation.

Figure 2:
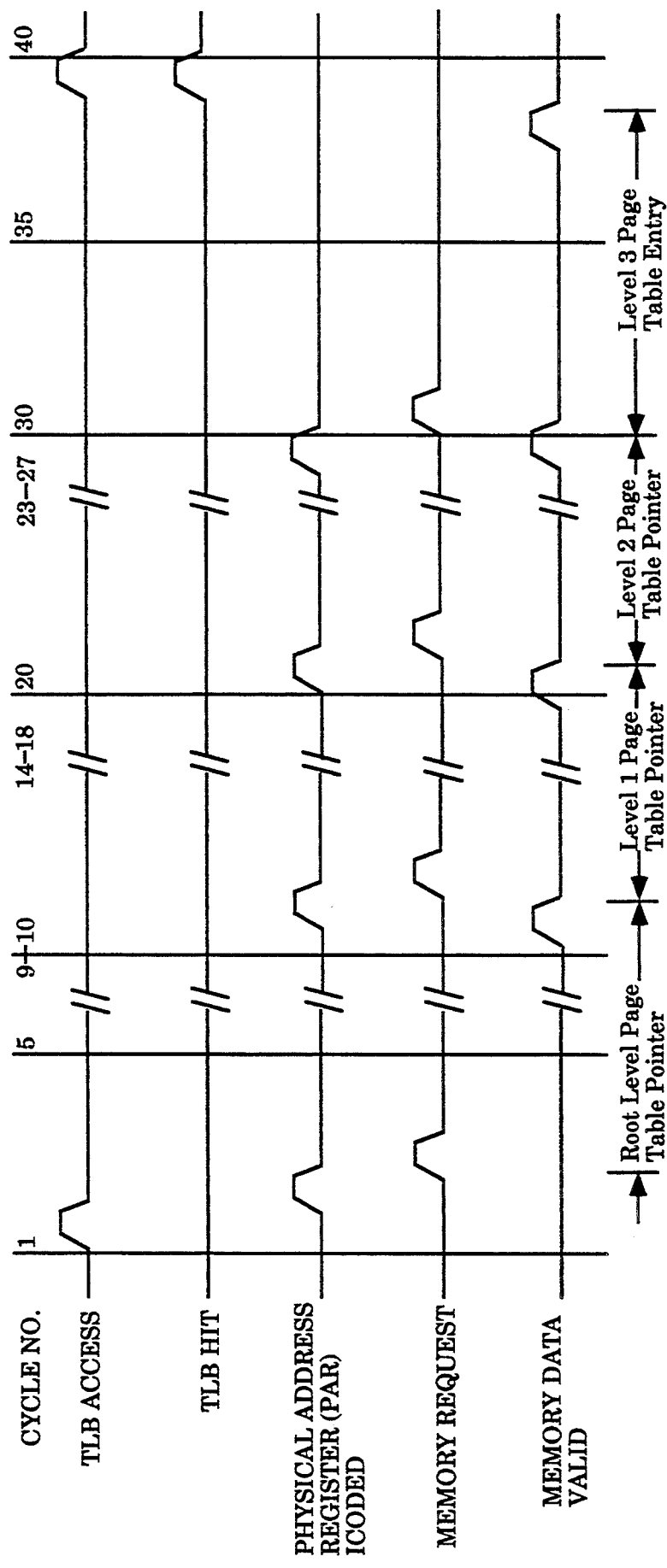
FIG. 2 is a timing diagram which illustrates the number of cycles used in a prior art system.

Referring to FIG. 2, a timing diagram is illustrated that shows the timing for a translation when the translation pointers required for the translation have not been stored in the translation lookaside buffer. Note that in this case, the present invention is as fast as a prior art TLB since there is a delay as each level of the required pointers are retrieved.

Referring again to FIG. 1, it should be noted that stored in the translation lookaside buffer 10 after this one entry has been recovered are not only a virtual address with a page table entry, but also a base address with a physical pointer, and up to two (2) additional physical pointers to corresponding page tables. In fact, it is also possible to have stored a third pointer to a page table. If a second virtual address is now offered to the translation lookaside buffer 10 and generates a miss, this will again cause the base address to be generated and combined with the context to produce a pointer to a second level table. This address is compared to the addresses stored in the translation lookaside buffer 10. Since this address is present in the virtual field of one of the entries stored in the translation lookaside buffer 10, only a single clock time is required to produce the next physical address, a page table pointer, rather than the ten or more clock times required on the first walk through the page table. On then recycling this new page table pointer, it is quite likely that the next pointer will produce another pointer which also is stored in the translation lookaside buffer 10 because the size of a memory page at this point is sixteen megabytes of memory. It is quite unlikely, that a program will take more than that space so the second pointer will probably also be recovered in the translation lookaside buffer 10. Ultimately, a particular page table entry must be recovered, but in general this takes only one level of search in the page tables resident in main memory. Tests have shown that in over ninety-nine percent of instances, the pointers sought will be in the translation lookaside buffer 10. Consequently, the speed of operation of the translation lookaside buffer of this invention is seen to greatly enhance the speed of operation of the computer system with which it is associated.

It should be noted that the instruction cache used with the translation lookaside buffer of this invention is adapted to operate in parallel with the translation lookaside buffer lookup so that cached instructions are rapidly produced. To this end, the data and instruction caches in the preferred embodiment of the invention are of page size and are consequently addressed by a combination of virtual and physical addresses. In the preferred embodiment, the least significant bits of the virtual address actually define the row of the particular cache while the physical bits determine whether the bits in the row are valid (come from the correct page) or not. To accomplish this, the cache stores a tag with each entry, and that tag includes the physical address of the page from which the information was derived. If this compares with the physical address presented by the translation lookaside buffer, there is a cache hit. Thus, for example, the cache may be preselecting the particular row at which the instruction may reside while the translation lookaside buffer is determining the physical address. Once the high order bits of the physical address are available, the information is available without delay.

Figure 3:
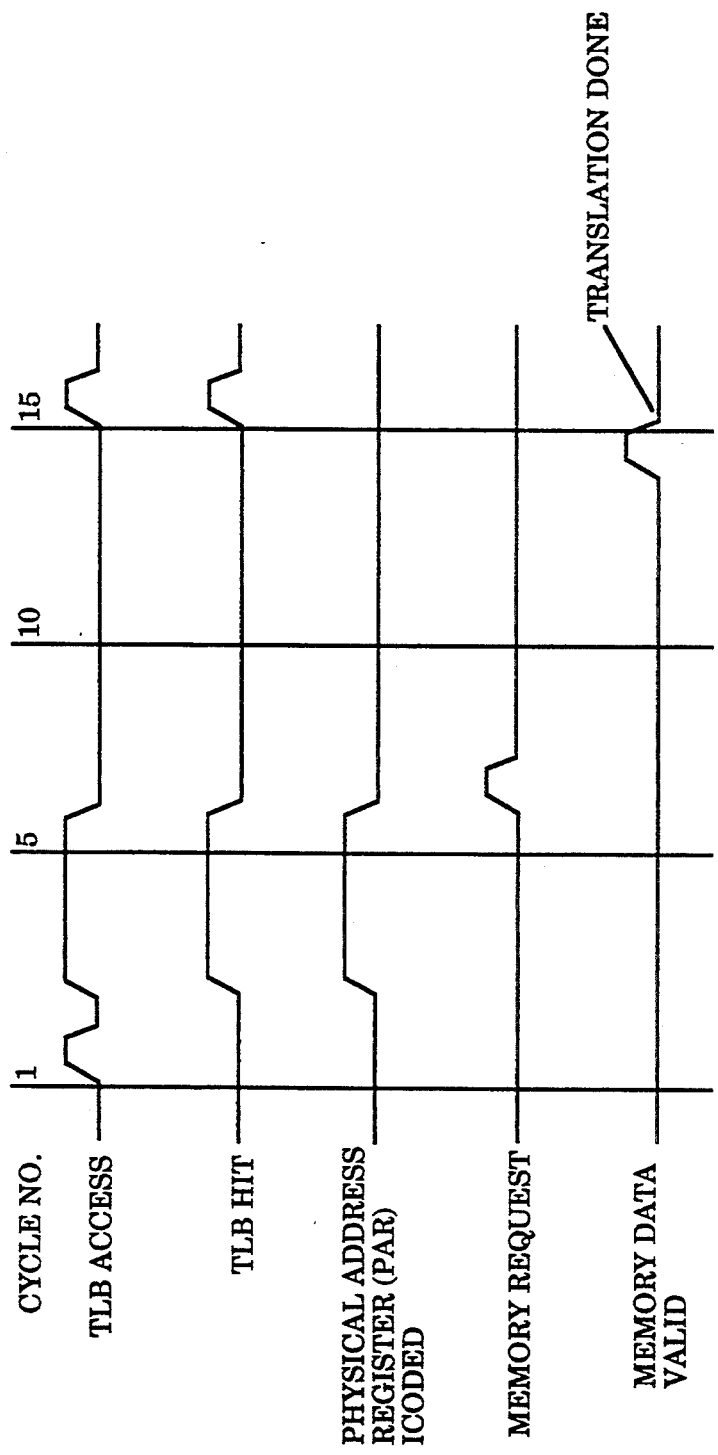
FIG. 3 is a timing diagram which illustrates the number of clock cycles used in accordance with the present invention.

FIG. 3 is a timing diagram which illustrates the number of cycles saved by the use of the present invention when the required page table pointers are in the TLB when a miss occurs. As may be seen, a significant amount of machine operation time is saved by the invention because the time required to fetch each level of page table pointer from slower memory is eliminated.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. In a computer system with paged memory and using translation tables of multi-level hierarchical structure, the multi-level hierarchical structure having a base level, at least one intermediate level and a page table level, a translation lookaside buffer comprising a plurality of table entries, each table entry of the table entries comprising:

a level field for storing a level indicator, the level indicator indicating a level within the hierarchical structure corresponding to the table entry;

a tag field for storing a tag against which a test is made to determine a match for the translation entry;

a page table pointer field for storing a page table pointer indicator, the page table pointer indicator indicating whether the tag field that corresponds to the translation entry is storing a physical address corresponding to a page table pointer or a virtual address tag; and a page table field for storing a translation that corresponds to the tag stored in the tag field of the translation entry;

such that if the level field indicates a base level, the page table pointer field indicating that the tag field is storing a physical address, the tag field storing a base address that is the physical address and the page table field storing a base page table pointer corresponding to the base address stored in the tag field;

if the level field indicates an intermediate level, the page table pointer field indicating that the tag field is storing a physical address, the tag field storing a next higher page table pointer to a next level page table, the next higher page table pointer being the physical address and the page table field storing a next level page table pointer corresponding to the next higher page table pointer stored in the tag field;

if the level field indicates a page table level, the page table pointer field indicating that the tag field is storing a virtual address tag, the tag field storing the virtual address tag, the virtual address tag being a portion of a virtual address to be translated and the page table field storing a physical address portion corresponding to the virtual address tag stored in the tag field.

2. The translation lookaside buffer as set forth in claim 1 wherein the tag field of each of the table entries is content addressable memory.

3. The translation lookaside buffer as set forth in claim 1 wherein the level, tag and page table pointer fields of each of the table entries are content addressable memory.

4. The translation lookaside buffer as set forth in claim 1 wherein each table entry further comprises an IO field, the IO field for storing an IO indicator for indicating whether the translation entry corresponds to a first virtual address space translation entry for a first virtual address space or corresponds to a second virtual address space translation entry for a second virtual address space, the first virtual address space used for addressing an input/output device and having a single level translation table, the second address space used for addressing data and instructions and using the multi-level translation table, wherein if the IO indicator indicates the translation entry is a second virtual address space translation entry, the level indicator indicating a level within the hierarchical structure corresponding to the table entry;

if the IO indicator indicates the translation entry is a first virtual address space translation entry, the level indicator indicating a level within the single level translation table corresponding to the table entry.

5. The translation lookaside buffer as set forth in claim 4 wherein the IO fields of each of the table entries are content addressable memory.

6. In a computer system with paged memory and using translation tables of multi-level hierarchical structure, the multi-level hierarchical structure having a base level, at least one intermediate level and a page table level, a translation lookaside buffer comprising a plurality of table entries, each table entry of the table entries comprising:

an IO field, the IO field for storing an IO indicator for indicating whether the translation entry corresponds to a first virtual address space translation entry for a first virtual address space or corresponds to a second virtual address space translation entry for a second virtual address space, the first virtual address space used for addressing an input/output device and having a single level translation table, the second address space used for addressing data and instructions and using the multi-level translation tables;

a level field for storing a level indicator, if the IO indicator indicates the translation entry is the second virtual address space translation entry, the level indicator indicating a level within the hierarchical structure corresponding to the table entry, if the IO indicator indicates the translation entry is the first virtual address space translation entry, the level indicator indicating a level within the single level translation table corresponding to the table entry;

a tag field for storing a tag against which a test is made to determine a match for the translation entry, the tag fields of each of the table entries being content addressable memory;

a page table pointer field for storing a page table pointer indicator, the page table pointer indicator indicating whether the tag field that corresponds to the translation entry is storing a physical address corresponding to a page table pointer or a virtual address tag; and a page table field for storing a translation that corresponds to the tag stored in the tag field of the translation entry;

such that if the level field indicates a base level, the page table pointer field indicating that the tag field is storing a physical address, the tag field storing a base address that is the physical address and the page table field storing a base page table pointer corresponding to the base address stored in the tag field;

if the level field indicates an intermediate level, the page table pointer field indicating that the tag field is storing a physical address, the tag field storing a next higher page table pointer to a next level page table, the next higher page table pointer being the physical address and the page table field storing a next level page table pointer corresponding to the next higher page table pointer stored in the tag field;

if the level field indicates a page table level, the page table pointer field indicating that the tag field is storing a virtual address tag, the tag field storing the virtual address tag, the virtual address tag being a portion of a virtual address to be translated and the page table field storing a physical address portion corresponding to the virtual address tag stored in the tag field.

7. The translation lookaside buffer as set forth in claim 6 wherein the level, page table pointer and IO fields of each of the table entries are content addressable memory.

8. In a computer system with paged memory and using translation tables of multi-level hierarchical structure, the multi-level hierarchical structure having a base level, at least one intermediate level and a page table level, a method for translating a virtual address to a physical address, the method comprising the steps of:

a) providing a translation lookaside buffer comprising a plurality of table entries, each table entry of the table entries comprising:

a level field for storing a level indicator, the level indicator indicating a level within the hierarchical structure corresponding to the table entry, a tag field for storing a tag against which a test is made to determine a match for the translation entry, a page table pointer field for storing a page table pointer indicator, the page table pointer indicator indicating whether the tag field that corresponds to the translation entry is storing a physical address corresponding to a page table pointer or a virtual address tag, and a page table field for storing a translation that corresponds to the tag stored in the tag field of the translation entry, such that if the level field indicates a base level, the page table pointer field indicating that the tag field is storing a physical address, the tag field storing a base address that is the physical address and the page table field storing a base page table pointer corresponding to the base address stored in the tag field, if the level field indicates an intermediate level, the page table pointer field indicating that the tag field is storing a physical address, the tag field storing a next higher page table pointer to a next level page table, the next higher page table pointer being a physical address and the page table field storing a next level page table pointer corresponding to the next higher page table pointer stored in the tag field, if the level field indicates a page table level, the page table pointer field indicating that the tag field is storing a virtual address tag, the tag field storing the virtual address tag, the virtual address tag being a portion of a virtual address to be translated and the page table field storing a physical address portion corresponding to the virtual address tag stored in the tag field;

b) deriving a candidate tag from the virtual address to be translated;

c) searching the table entries for a table entry that has a page table pointer field that indicates a virtual address tag and a tag stored in the tag field that matches the candidate tag;

d) if a matching table entry was found in step c), deriving the physical address corresponding to the virtual address to be translated by combining the physical address portion stored in the page table field of the matching table entry with a least significant bits portion of the virtual address to be translated and stopping because the translation was found;

e) if a matching table entry was not found in step c), proceeding to step f);

f) obtaining a base address corresponding to the virtual address to be translated and searching the table entries for a translation entry that has a page table pointer field that indicates a physical address in the tag field, a level field that indicates the base level and a tag stored in the tag field that matches the base address;

g) if a matching table entry was not found in step f), obtaining a base table pointer corresponding to the base address, storing the base address and the corresponding base table pointer in a base level table entry and repeating step f);

h) obtaining the table pointer from the page table field of the matching table entry and searching the table entries for a translation entry that has a page table pointer field that indicates a physical address in the tag field, an intermediate level field and a tag stored in the tag field that matches the table pointer from the page table field of the matching table entry;

i) if a matching table entry was not found in step h), obtaining the table pointer sought in step h), storing the table pointer sought in an intermediate level table entry and repeating step h);

j) repeating steps h) and i) until the highest level lookup table is reached and provides a physical page number corresponding to the virtual address to be translated, then storing the virtual address tag and the physical page number corresponding to the virtual address to be translated in a table entry that has a page table pointer field that indicates a virtual address tag and returning to step c).

9. The method for translating a virtual address to a physical address as set forth in claim 8 wherein each table entry further comprises an IO field, the IO field for storing an IO indicator for indicating whether the translation entry corresponds to a first virtual address space translation entry for a first virtual address space or corresponds to a second virtual address space translation entry for a second virtual address space, the first virtual address space used for addressing an input/output device and having a single level translation table, the second address space used for addressing data and instructions and using a multi-level translation table, wherein if the IO indicator indicates the translation entry is the second virtual address space translation entry, the level indicator indicating a level within the hierarchical structure corresponding to the table entry, if the IO indicator indicates the translation entry is the first virtual address space translation entry, the level indicator indicating a level within a single level translation table corresponding to the table entry and in any method step including searching the translation entries for a match, a match is found only if the IO indicator of a candidate translation entry indicates that the virtual address space of the candidate translation entry matches the virtual address space of the virtual address to be translated.

* * * * *